US010806969B2

(12) United States Patent
Inoue et al.

(10) Patent No.: US 10,806,969 B2
(45) Date of Patent: *Oct. 20, 2020

(54) GOLF BALL

(71) Applicant: SUMITOMO RUBBER INDUSTRIES, LTD., Kobe-Shi, Hyogo (JP)

(72) Inventors: Hidetaka Inoue, Kobe (JP); Toshiyuki Tarao, Kobe (JP); Kuniyasu Horiuchi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 16/206,659

(22) Filed: Nov. 30, 2018

(65) Prior Publication Data

US 2019/0091517 A1 Mar. 28, 2019

Related U.S. Application Data

(63) Continuation of application No. 15/422,623, filed on Feb. 2, 2017, now Pat. No. 10,238,920, which is a continuation of application No. 14/941,315, filed on Nov. 13, 2015, now Pat. No. 9,656,126.

(30) Foreign Application Priority Data

Nov. 14, 2014 (JP) .................... 2014-232205

(51) Int. Cl.
| | | |
|---|---|---|
| A63B 37/00 | (2006.01) | |
| C09D 175/08 | (2006.01) | |
| C09D 105/16 | (2006.01) | |
| C08G 83/00 | (2006.01) | |
| C08G 18/48 | (2006.01) | |
| C08G 18/62 | (2006.01) | |
| C08G 18/79 | (2006.01) | |
| C08G 18/24 | (2006.01) | |
| C08G 18/40 | (2006.01) | |
| C08G 18/42 | (2006.01) | |
| C08G 18/00 | (2006.01) | |

(52) U.S. Cl.
CPC ...... *A63B 37/0022* (2013.01); *A63B 37/0031* (2013.01); *A63B 37/0074* (2013.01); *A63B 37/0089* (2013.01); *C08G 18/00* (2013.01); *C08G 18/246* (2013.01); *C08G 18/4063* (2013.01); *C08G 18/4277* (2013.01); *C08G 18/4883* (2013.01); *C08G 18/4887* (2013.01); *C08G 18/6275* (2013.01); *C08G 18/792* (2013.01); *C08G 83/007* (2013.01); *C09D 105/16* (2013.01); *C09D 175/08* (2013.01)

(58) Field of Classification Search
None
See application file for complete search history.

(56) References Cited

U.S. PATENT DOCUMENTS

| | | | |
|---|---|---|---|
| 6,454,667 B1 | 9/2002 | Iwami | |
| 9,656,126 B2 | 5/2017 | Inoue et al. | |
| 10,010,762 B2 | 7/2018 | Tarao et al. | |
| 10,046,204 B2 | 8/2018 | Inoue et al. | |
| 10,238,920 B2 * | 3/2019 | Inoue ................ | A63B 37/0022 |
| 2003/0083158 A1 | 5/2003 | Ishino | |
| 2003/0176242 A1 | 9/2003 | Mano | |
| 2009/0281213 A1 | 11/2009 | Ito et al. | |
| 2011/0053708 A1 | 3/2011 | Isogawa et al. | |
| 2011/0136585 A1 | 6/2011 | Stites | |
| 2011/0244989 A1 | 10/2011 | Tarao et al. | |
| 2017/0056731 A1 | 3/2017 | Tarao et al. | |
| 2017/0165527 A1 | 6/2017 | Inoue et al. | |
| 2017/0340922 A1 | 11/2017 | Inoue et al. | |
| 2019/0282859 A1 * | 9/2019 | Inoue ................... | C08G 18/246 |

FOREIGN PATENT DOCUMENTS

| | | | |
|---|---|---|---|
| JP | 2000-288125 A | 10/2000 | |
| JP | 2003-265650 A | 9/2003 | |
| JP | 2006-075209 A | 3/2006 | |
| JP | 2006-075210 A | 3/2006 | |
| JP | 2011-067595 A | 4/2011 | |
| JP | 2011-217820 A | 11/2011 | |

OTHER PUBLICATIONS

SeRN Super Polymer User's Guide; Advanced Softnaterials (2011) pp. 1-4. (Year: 2011).*
SeRN Super Polymer User's Guide; Advanced Softmaterials (2011) pp. 1-4.

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a golf ball showing increased controllability on approach shots for less than 40 yards and showing excellent shot feeling. In the inventive golf ball, the paint film is formed from a curing type paint composition including: a base material containing a polyrotaxane, and a curing agent containing a polyisocyanate, and wherein the polyrotaxane has a cyclodextrin, a linear molecule included in a cyclic structure of the cyclodextrin in a manner of piercing through the cyclic structure of the cyclodextrin, and a blocking group located at both ends of the linear molecule to prevent disassociation of the cyclodextrin, and at least a part of hydroxyl groups of the cyclodextrin is modified with a caprolactone chain via —O—$C_3H_6$—O— group.

20 Claims, 7 Drawing Sheets

(a)

(b)

GOLF BALL

CROSS-REFERENCE TO RELATED APPLICATIONS

This application is a Continuation of co-pending U.S. application Ser. No. 15/422,623 filed on Feb. 2, 2017 (now U.S. Pat. No. 10,238,920 issued Mar. 26, 2019), which is a Continuation of U.S. application Ser. No. 14/941,315 filed on Nov. 13, 2015 (now U.S. Pat. No. 9,656,126 issued May 23, 2017), which claims priority under 35 U.S.C. § 119(a) to Patent Application No. 2014-232205 filed in Japan on Nov. 14, 2014. The entire contents of which are hereby incorporated by reference.

FIELD OF THE INVENTION

The present invention relates to a technology for improving spin performance of a golf ball.

DESCRIPTION OF THE RELATED ART

A paint film is formed on a surface of a golf ball body. Improvement of a golf ball performance by improving the paint film has been proposed.

Japanese Patent Publication No. 2011-67595 A discloses a golf ball comprising a core, a cover situated on the external side of the core, and a paint layer situated on the external side of the cover, wherein the cover has a Shore D hardness of 61 or less, and the paint layer has a Martens hardness of 2.0 mgf/$\mu$m² or less. The golf ball is excellent in spin performance, spin rate stability and paint layer durability.

Japanese Patent Publication No. 2011-217820 A discloses a golf ball comprising a golf ball body and a paint film formed on a surface of the golf ball body, wherein the paint film has a Martens hardness of 2.0 mgf/$\mu$m² or less, and a ratio (50% elastic modulus/10% elastic modulus) of a 50% elastic modulus to a 10% elastic modulus of 1.6 or more. The golf ball has a high spin rate on approach shots under a wet condition and rough condition.

Japanese Patent Publications No. 2006-75209 A and No. 2006-75210 A have proposed a golf ball stopping quickly with an increased launch angle. Japanese Patent Publication No. 2006-75209 A discloses a golf ball comprising a golf ball body and a paint film covering a surface of the golf ball body, wherein a resin component constituting the paint film is cured by a polyamide based curing agent, and the golf ball has a static coefficient of friction of 0.22 or less. Japanese Patent Publication No. 2006-75210 A discloses a golf ball comprising a golf ball body and a paint film covering the golf ball body, wherein the paint film contains metal particles.

Japanese Patent Publication No. 2000-288125 A has proposed a golf ball showing improved durability and abrasion resistance. The golf ball showing excellent durability comprises a core, a cover and at least one paint layer formed on the cover, wherein the cover has a Shore D hardness ranging from 50 to 65 and a bending flexural modulus ranging from 1,000 to 2,000 kgf/cm², and at least an outermost layer of the paint has a 10% modulus of from 5 to 50 kgf/cm².

Japanese Patent Publication No. 2003-265650 A has proposed a golf ball showing improved spin retention ratio without sacrificing the required properties for the paint film. The golf ball comprises a core, at least one cover layer covering the core and a paint film formed on an outer surface of the cover, wherein the paint film has a thickness falling within a range of 25 $\mu$m or more and 125 $\mu$m or less and a 50% modulus falling within a range of 5 MPa or more and 50 MPa or less, and R expressed by a following equation (1) falls within a range of 0.01 or more and 0.5 or less, when CL (mm) represents a thickness of an outermost layer of the cover, and PL ($\mu$m) represents the thickness of the paint film;

$$R=PL/CL/1{,}000 \tag{1}.$$

SUMMARY OF THE INVENTION

It is needless to say that not only flight distance on driver shots but also accuracy on approach shots are important in making a score in golf. A golf ball employing a relatively flexible thermoplastic polyurethane as a cover material is excellent in controllability on approach shots for a distance of about 40 yards to 100 yards. However, almost no consideration is given to controllability on approach shots for less than 40 yards, in particular, for about 10 yards to 20 yards, i.e. around the green. In addition, no consideration is given to controllability on approach shots from the rough.

The present invention has been made in view of the above-described situation, and an object of the present invention is to provide a golf ball showing improved controllability on approach shots for less than 40 yards, in particular, on approach shots around the green (about 10 yards to 20 yards) and improved controllability on approach shots from the rough, and showing excellent shot feeling.

The golf ball according to the present invention comprises a golf ball body and a paint film formed on a surface of the golf ball body, wherein the paint film is formed from a curing type paint composition including: a base material containing a polyrotaxane, and a curing agent containing a polyisocyanate, and wherein the polyrotaxane has a cyclodextrin, a linear molecule included in a cyclic structure of the cyclodextrin in a manner of piercing through the cyclic structure of the cyclodextrin, and having blocking groups located at both ends of the linear molecule to prevent disassociation of the cyclodextrin, and at least a part of hydroxyl groups of the cyclodextrin is modified with a caprolactone chain via —O—$C_3H_6$—O— group. The hydroxyl group of the cyclodextrin included in the polyrotaxane reacts with the isocyanate group of the polyisocyanate to form the paint film. The golf ball having this paint film formed on the surface of the golf ball body is excellent in controllability on approach shots for less than 40 yards, in particular, on approach shots around the green (about 10 yards to 20 yards), and is excellent in shot feeling.

According to the present invention, a golf ball showing improved controllability on approach shots for less than 40 yards, in particular, on approach shots around the green (about 10 yards to 20 yards) and improved controllability on approach shots from the rough, and showing excellent shot feeling, can be obtained.

DESCRIPTION OF THE PREFERRED EMBODIMENT

Figure 1:
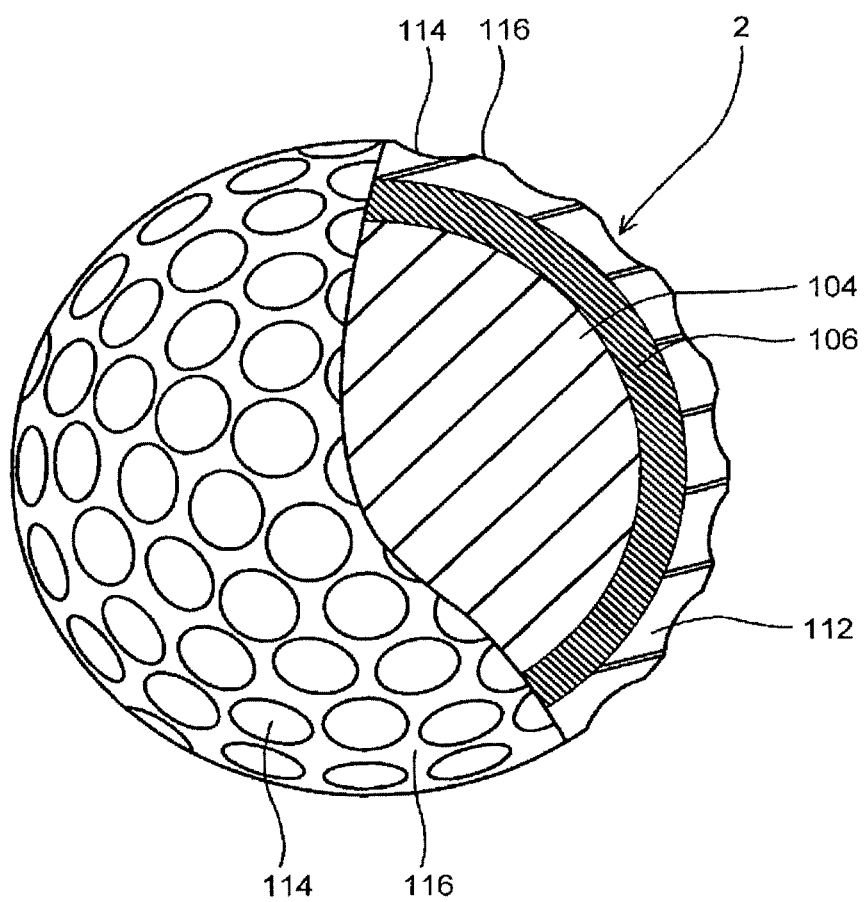
FIG. 1 is a partially cutaway cross-sectional view of a golf ball according to an embodiment of the present invention.

The golf ball according to the present invention comprises a golf ball body and a paint film formed on a surface of the golf ball body, wherein the paint film is formed from a curing type paint composition including: a base material containing a polyrotaxane, and a curing agent containing a polyisocyanate, and wherein the polyrotaxane has a cyclodextrin, a linear molecule included in a cyclic structure of the cyclodextrin in a manner of piercing through the cyclic structure of the cyclodextrin, and having blocking groups located at both ends of the linear molecule to prevent disassociation of the cyclodextrin, and at least a part of hydroxyl groups of the cyclodextrin is modified with a caprolactone chain via —O—$C_3H_6$—O— group.

[Polyrotaxane]

First, the base material will be described. The base material contains a polyrotaxane as a resin component. The polyrotaxane has a cyclodextrin, a linear molecule piercing through the cyclic structure of the cyclodextrin, and having blocking groups located at both ends of the linear molecule to prevent disassociation of the ring molecule. The polyrotaxane is viscoelastic, since the cyclodextrin molecule is movable along the linear molecule that penetrates the cyclodextrin in a skewerring manner (pulley effect). Even if a tension is applied to the polyrotaxane, the tension can be uniformly dispersed due to the pulley effect. Thus, the polyrotaxane has an excellent property that a crack or flaw very hardly occurs, unlike a conventional crosslinked polymer.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cyclodextrin include α-cyclodextrin (number of glucose units: 6), β-cyclodextrin (number of glucose units: 7), and γ-cyclodextrin (number of glucose units: 8), and α-cyclodextrin is preferable. As the cyclodextrin, one type may be used solely, and two or more types may be used in combination.

The linear molecule is not particularly limited, as long as it is a linear molecule capable of piercing through the cyclic structure of the cyclodextrin so that the cyclic structure of the cyclodextrin is rotatable around the linear molecule. Examples of the linear molecule include polyalkylene, polyester, polyether, and polyacrylic acid. Among them, polyether is preferable, and polyethylene glycol is particularly preferable. Polyethylene glycol has less steric hindrance, and thus can be easily included in the cyclic structure of the cyclodextrin in a manner of piercing through the cyclic structure of the cyclodextrin.

The weight average molecular weight of the linear molecule is preferably 5,000 or more, more preferably 6,000 or more, and is preferably 100,000 or less, more preferably 80,000 or less.

The linear molecule preferably has functional groups at both ends thereof. When the linear molecule has the functional group, the linear molecule can easily react with the blocking group. Examples of the functional group include a hydroxyl group, carboxyl group, amino group, and thiol group.

The blocking groups are not particularly limited, as long as they are located at both ends of the linear molecule to prevent the cyclodextrin from disassociating from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number (inclusion amount) of the cyclodextrins including the linear molecule preferably ranges from 0.06 to 0.61, more preferably ranges from 0.11 to 0.48, even more preferably ranges from 0.24 to 0.41, if the maximum inclusion amount is deemed as 1. This is because if the inclusion amount is less than 0.06, the pulley effect may not be exerted, and if the inclusion amount exceeds 0.61, the cyclodextrins are very densely located, so that the movability of the cyclodextrin may decrease.

As the polyrotaxane used in the present invention, a polyrotaxan having at least a part of hydroxyl groups of the cyclodextrin being modified with a caprolactone chain, is preferred. This is because if at least a part of hydroxyl groups of the cyclodextrin included in the polyrotaxane is modified with the caprolactone, steric hindrance between the polyrotaxane and the polyisocyanate is alleviated, so that the efficiency of a reaction with the polyisocyanate increases.

As the above modification, for example, the hydroxyl groups of the cyclodextrin are treated with propylene oxide to hydroxylalkylate the cyclodextrin, and then ε-caprolactone is added to perform ring-opening polymerization. As a result of this modification, the caprolactone chain —(CO$(CH_2)_5$O)nH (n is a natural number of 1 to 100) is linked to the exterior side of the cyclic structure of the cyclodextrin via —O—$C_3H_6$—O— group. "n" represents the degree of polymerization, and is preferably a natural number of 1 to 100, more preferably a natural number of 2 to 70, even more further preferably a natural number of 3 to 40. At the other end of the caprolactone chain, a hydroxyl group is formed through the ring-opening polymerization. The hydroxyl group at the end of the caprolactone chain can react with the polyisocyanate.

The ratio of the hydroxyl groups modified with the caprolactone chain to all the hydroxyl groups (100 mole %) included in the cyclodextrin before the modification is preferably 2 mole % or more, more preferably 5 mole % or more, even more preferably 10 mole % or more. If the ratio of the hydroxyl groups modified with the caprolactone chain falls within the above range, the hydrophobicity of the polyrotaxane increases, and the reactivity with the polyisocyanate increases.

The hydroxyl value of the polyrotaxane is preferably 10 mg KOH/g or more, more preferably 15 mg KOH/g or more, even more preferably 20 mg KOH/g or more, and is preferably 400 mg KOH/g or less, more preferably 300 mg KOH/g or less, even more preferably 220 mg KOH/g or less, particularly preferably 180 mg KOH/g or less. If the hydroxyl value of the polyrotaxane falls within the above range, the reactivity with the polyisocyanate increases, and thus the durability of the paint film becomes more favorable. The hydroxyl value can be measured according to JIS K 1557-1, for example, by an acetylation method.

The total molecular weight of the polyrotaxane is preferably 30,000 or more, more preferably 40,000 or more, even more preferably 50,000 or more, and is preferably 3,000,000 or less, more preferably 2,500,000 or less, even more preferably 2,000,000 or less, in a weight average molecular weight. If the weight average molecular weight is 30,000 or more, the paint film has sufficient strength, and if the weight average molecular weight is 3,000,000 or less, the paint film has sufficient flexibility and thus approach performance of the golf ball increases. It is noted that the weight average molecular weight of the polyrotaxane can be measured, for example, by gel permeation chromatography (GPC) using polystyrene as a standard substance, tetrahydrofuran as an eluant, and an organic solvent GPC column (e.g., "Shodex (registered trademark) KF series" manufactured by Showa Denko K.K.) as a column.

The content of the polyrotaxane in the resin component of the base material is preferably 10 mass % or more, more preferably 15 mass % or more, even more preferably 20 mass % or more, and is preferably 100 mass % or less, more preferably 90 mass % or less, even more preferably 85 mass % or less.

Specific examples of the polyrotaxane modified with the polycaprolactone include SeRM super polymer SH3400P, SH2400P, and SH1310P manufactured by Advanced Softmaterials Inc.

[Other Polyol]

In the present invention, the base material preferably further contains, as a resin component, at least one polyol selected from the group consisting of a polyether polyol, a polyester polyol, a polycaprolactone polyol, a polycarbonate polyol, and an acrylic polyol.

Examples of the polyol include a polyether polyol such as polyoxyethylene glycol (PEG), polyoxypropylene glycol (PPG), and polyoxytetramethylene glycol (PTMG); a polyester polyol such as polyethylene adipate (PEA), polybutylene adipate (PBA), and polyhexamethylene adipate (PHMA); a polycaprolactone polyol such as poly-ε-caprolactone (PCL); a polycarbonate polyol such as polyhexamethylene carbonate; and an acrylic polyol. The polyol is preferably a diol or triol, and is more preferably a triol. The polyol may be used solely, or two or more of the polyols may be used in combination.

In the present invention, the curing type paint composition preferably includes the polycaprolactone polyol (poly-ε-caprolactone (PCL)) as the polyol. Specific examples of the polycaprolactone polyol include Placcel 308 and Placcel 312 manufactured by Daicel Chemical Industries, Ltd., and Capa 4101 and Capa 4801 (having a typical molecular weight of 8,000) manufactured by Perstorp Co., Ltd.

The hydroxyl value of the polyol is preferably 10 mg KOH/g or more, more preferably 15 mg KOH/g or more, even more preferably 20 mg KOH/g or more, and is preferably 400 mg KOH/g or less, more preferably 300 mg KOH/g or less, even more preferably 250 mg KOH/g or less, particularly preferably 200 mg KOH/g or less. If the hydroxyl value of the polyol falls within the above range, the adhesion between the paint film and the golf ball body increases. In the present invention, the hydroxyl value can be measured according to JIS K 1557-1, for example, by an acetylation method.

The weight average molecular weight of the polyol is preferably 500 or more, more preferably 550 or more, even more preferably 600 or more, and is preferably 150,000 or less, more preferably 140,000 or less, even more preferably 130,000 or less. If the weight average molecular weight of the polyol falls within the above range, water resistance and impact resistance of the paint film can be increased. It is noted that the weight average molecular weight of the polyol can be measured, for example, by gel permeation chromatography (GPC) using polystyrene as a standard substance, tetrahydrofuran as an eluant, and an organic solvent GPC column (e.g., "Shodex (registered trademark) KF series" manufactured by Showa Denko K.K.) as a column.

The content of the polyol in the resin component contained in the base material is preferably 0 mass % or more, more preferably 5 mass % or more, even more preferably 10 mass % or more, and is preferably 90 mass % or less, more preferably 85 mass % or less, even more preferably 80 mass % or less. The mass ratio (polyol/polyrotaxane) of the polyol to the polyrotaxane is preferably 0/100 or more, more preferably 5/95 or more, even more preferably 10/90 or more, and is preferably 90/10 or less, more preferably 85/15 or less, even more preferably 80/20 or less.

The curing type paint composition used in the present invention may further include, as a resin component, a vinyl chloride-vinyl acetate copolymer and/or a modified product thereof. This is because, if the vinyl chloride-vinyl acetate copolymer and/or the modified product thereof is included, the adhesion can be adjusted while maintaining scuff resistance, and moderate tacky feeling is obtained. Examples of the modification method include a method of copolymerizing a monomer (e.g., vinyl alcohol, hydroxyalkyl acrylate, etc.) copolymerizable with vinyl chloride and vinyl acetate; and a method of partially or completely saponifying a vinyl chloride-vinyl acetate copolymer to introduce hydroxyl groups therein.

The content of the vinyl chloride component in the vinyl chloride-vinyl acetate copolymer and/or the modified product thereof is preferably 1 mass % or more, more preferably 20 mass % or more, even more preferably 50 mass % or more, and is preferably 99 mass % or less, more preferably 95 mass % or less. In the present invention, as the vinyl chloride-vinyl acetate copolymer and/or the modified product thereof, a hydroxyl group-modified vinyl chloride-vinyl acetate copolymer is preferably used. Specific examples of the vinyl chloride-vinyl acetate copolymer and/or the modified product thereof include Solbin (registered trademark) A, Solbin AL, Solbin TA2, and Solbin TA3 manufactured by Nissin Chemical Industry Co., Ltd.

The curing type paint composition used in the present invention preferably further includes a modified silicone. If the modified silicone is included as a leveling agent, unevenness of the coated surface can be reduced, and thus a smooth coated surface can be formed on the surface of the golf ball. Examples of the modified silicone include a modified silicone having an organic group being introduced to a side chain or an end of a polysiloxane skeleton, a polysiloxane block copolymer obtained by copolymerizing a polyether block and/or a polycaprolactone block, etc. with a polysiloxane block, and a modified silicone having an organic group being introduced to a side chain or an end of the polysiloxane block copolymer. The polysiloxane skeleton or the polysiloxane block is preferably linear, and examples thereof include dimethyl polysiloxane, methylphenyl polysiloxane, and methyl hydrogen polysiloxane. Examples of the organic group include an amino group, epoxy group, mercapto group, and carbinol group. In the present invention, as the modified silicone oil, a polydimethylsiloxane-polycaprolactone block copolymer is preferably used, and a terminal carbinol-modified polydimethylsiloxane-polycaprolactone block copolymer is more preferably used. This is because these block copolymers have excellent compatibility with the caprolactone-modified polyrotaxane and the polycaprolactone polyol. Specific examples of the modified silicone used in the present invention include DBL-C31, DBE-224, and DCE-7521 manufactured by Gelest, Inc.

Next, the curing agent will be described. The curing agent contains a polyisocyanate. Examples of the polyisocyanate include a compound having at least two isocyanate groups.

Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylene diisocyanate (TMXDI), para-phenylene diisocyanate (PPDI); an alicyclic polyisocyanate or aliphatic polyisocyanate such as 4,4'-dicyclohexylmethane diisocyanate ($H_{12}MDI$), hydrogenated xylylenediisocyanate ($H_6XDI$), hexamethylene diisocyanate (HDI), isophorone diisocyanate (IPDI), and norbornene diisocyanate (NBDI); and derivates of these polyisocyanates. In the present invention, as the polyisocyanate, two or more of them may be used.

Examples of the derivative of the polyisocyanate include an isocyanurate of diisocyanate; an adduct obtained through a reaction between a diisocyanate and a low molecular weight triol such as trimethylolpropane or glycerin; an allophanate-modified product; and a biuret-modified product. It is preferable that a free diisocyanate is removed from the derivative of the polyisocyanate. The allophanate-modified product is, for example, a trifunctional polyisocyanate obtained by further reacting a diisocyanate with a urethane bond formed through a reaction between a diisocyanate and a low molecular weight diol. The biuret-modified products is, for example, a trifunctional polyisocyanate having a biuret bond and represented by the following formula (1). The isocyanurate of diisocyanate is, for example, a trifunctional polyisocyanate represented by the following formula (2).

It is noted that in the formulae (1) and (2), R represents a residue where the isocyanate group is removed from the diisocyanate.

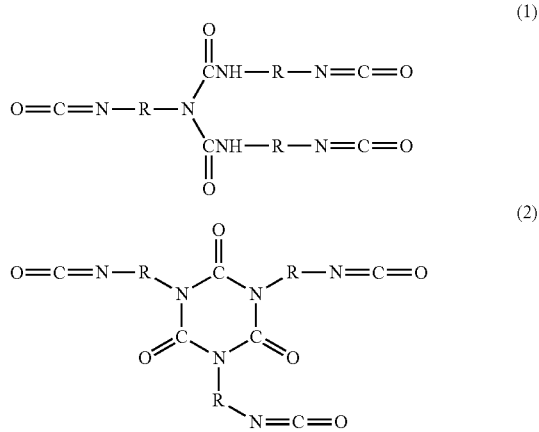

In the present invention, as the polyisocyanate, the isocyanurate is preferably used, and the isocyanurate of hexamethylene diisocyanate is more preferably used.

The content (NCO %) of the isocyanate group in the polyisocyanate is preferably 0.5 mass % or more, more preferably 1 mass % or more, even more preferably 2 mass % or more, and is preferably 45 mass % or less, more preferably 40 mass % or less, even more preferably 35 mass % or less. It is noted that the content (NCO %) of the isocyanate group in the polyisocyanate can be represented by 100×[mole number of isocyanate group in polyisocyanate×42 (molecular weight of NCO)]/[total mass (g) of polyisocyanate].

Specific examples of the polyisocyanate include Burnock D-800, Burnock DN-950, and Burnock DN-955 manufactured by DIC corporation; Desmodur N75MPA/X, Desmodur N3300, Desmodur N3390, Desmodur L75 (C), and Sumidur E21-1 manufactured by Sumika Bayer Urethane Co., Ltd; Coronate HX, and Coronate HK manufactured by Nippon Polyurethane Industry Co., Ltd; Duranate 24A-100, Duranate 21S-75E, Duranate TPA-100, and Duranate TKA-100 manufactured by Asahi Kasei Chemicals Corporation; and VESTANAT T1890 manufactured by Degussa Co., Ltd.

The curing type paint composition used in the present invention includes a base material containing the polyrotaxane and a curing agent containing the polyisocyanate. In the present invention, in order to distinguish the composition containing the polyrotaxane and the composition containing the polyisocyanate, as a matter of convenience, the composition containing the polyrotaxane is referred to as the base material, and the composition containing the polyisocyanate is referred to as the curing agent. In addition, the base material may also be referred to as the A agent, and the curing agent may also be referred to as the B agent. Furthermore, the composition containing the polyrotaxane may also be referred to as the curing agent, and the composition containing the polyisocyanate may also be referred to as the base material.

In the curing type paint composition used in the present invention, the base material preferably contains a compound having reactivity with the isocyanate group included in the curing agent. Specifically, the base material contains the polyrotaxane, and preferably further contains a polyol. The base material of the curing type paint composition preferably contains a vinyl chloride-vinyl acetate copolymer and/or a modified product thereof, and a modified silicone.

In this case, the content of the vinyl chloride-vinyl acetate copolymer and/or the modified product thereof in the resin component of the base material is preferably 4 mass % or more, more preferably 8 mass % or more, and is preferably 50 mass % or less, more preferably 45 mass % or less. The content of the modified silicone is preferably 0.01 part by mass or more, more preferably 0.05 part by mass or more, and is preferably 10 parts by mass or less, more preferably 5 parts by mass or less, with respect to 100 parts by mass of the resin component in the base material.

In the curing reaction of the curing type paint composition, the molar ratio (NCO group/OH group) of the isocyanate group (NCO group) of the curing agent to the hydroxyl group (OH group) of the base material is preferably 0.1 or more, more preferably 0.2 or more. If the molar ratio (NCO group/OH group) is less than 0.1, the curing reaction may become insufficient. Further, if the molar ratio (NCO group/OH group) is too large, the amount of the isocyanate group is excessive, and the obtained paint film may become hard and fragile as well as the appearance of the obtained paint film may deteriorate. Thus, the molar ratio (NOC group/OH group) is preferably 1.5 or less, more preferably 1.4 or less, even more preferably 1.3 or less. The reason why the appearance of the obtained paint film deteriorates if the amount of the isocyanate group in the paint becomes excessive is that an excessive amount of the isocyanate group may promote a reaction between the moisture in the air and the isocyanate group, thereby generating a lot of carbon dioxide gas. It is noted that, when the NCO/OH molar ratio in the curing reaction is taken into account, the hydroxyl group of the base material includes the hydroxyl groups of the polyrotaxane and the polyol, but excludes the hydroxyl groups of the modified product of the vinyl chloride-vinyl acetate copolymer, the modified silicone, and the like.

[Solvent]

The curing type paint composition is preferably a solvent based paint containing an organic solvent as a dispersion medium. This is because the polyrotaxane is insoluble in water, and the organic solvent is preferably used. Examples of the preferable solvent include toluene, isopropyl alcohol, xylene, methylethyl ketone, methylisobutyl ketone, ethylene glycol monomethyl ether, ethylbenzene, propylene glycol monomethyl ether, isobutyl alcohol, and ethyl acetate. The solvent may be added in either of the base material and the curing agent, and in light of uniformly performing the curing reaction, the solvent is preferably added in the base material and the curing agent, respectively.

A conventionally known catalyst can be employed for the curing reaction. Examples of the catalyst include a monoamine such as triethyl amine and N,N-dimethylcyclohexylamine; a polyamine such as N,N,N',N'-tetramethylethylene diamine and N,N,N',N'',N''-pentamethyldiethylene triamine; a cyclic diamine such as 1,8-diazabicyclo[5.4.0]-7-undecene (DBU) and triethylene diamine; a tin catalyst such as dibutyl tin dilaurate and dibutyl tin diacetate. These catalysts may be used solely, or two or more of the catalysts may be used in combination. Among them, the tin catalyst such as dibutyl tin dilaurate and dibutyl tin diacetate is preferred, and in particular, dibutyl tin dilaurate is preferably used.

The curing type paint composition may further include additives generally included in the paint for a golf ball, such as a filler, ultraviolet absorber, antioxidant, light stabilizer, fluorescent brightener, anti-blocking agent, leveling agent, slip agent, and viscosity modifier, where necessary.

Next, the method of applying the curing type paint composition of the present invention will be described. The method of applying the curing type paint composition is not limited, a conventionally known method can be adopted, and examples thereof include a spray coating and electrostatic coating.

In the case of performing the spray coating with an air gun, the base material and the curing agent are fed with respective pumps and continuously mixed with a line mixer located in the stream line just before the air gun, and the obtained mixture is air-sprayed. Alternatively, the base material and the curing agent are air-sprayed respectively with an air spray system provided with a device for controlling the mixing ratio thereof. The paint application may be conducted by spraying the paint one time or overspraying the paint multiple times.

The curing type paint applied to the golf ball body can be dried, for example, at a temperature ranging from 30° C. to 70° C. for 1 hour to 24 hours to form the paint film.

The thickness of the paint film after drying is preferably, without limitation, 5 μm or more, more preferably 6 μm or more, even more preferably 10 μm or more, most preferably 15 μm or more. If the thickness is less than 5 μm, the paint film is likely to wear off due to the continued use, and thickening the paint film increases the spin rate on approach shots. The thickness of the paint film is preferably 50 μm or less, more preferably 45 μm or less, even more preferably 40 μm or less. If the thickness of the paint film is thicker than 50 μm, the dimple effect is lowered, and thus the flying performance of the golf ball tends to be lowered. The thickness of the paint film can be measured, for example, by observing a cross section of the golf ball using a microscope (VHX-1000 manufactured by Keyence Corporation). In the case of overpainting the paint, a total thickness of the formed paint film preferably falls within the above range.

The 10% elastic modulus of the paint film formed on the surface of the golf ball body according to the present invention is preferably 160 kgf/cm$^2$ or less, more preferably 130 kgf/cm$^2$ or less, even more preferably 110 kgf/cm$^2$ or less. If the 10% elastic modulus is 160 kgf/cm$^2$ or less, the paint film is flexible and the spin rate on approach shots increases. The lower limit of the 10% elastic modulus of the paint film is not particularly limited, and is preferably 4 kgf/cm$^2$, more preferably 6 kgf/cm$^2$. If the 10% elastic modulus is excessively low, the paint film becomes so soft that tackiness is left and feeling becomes worse.

[Golf Ball Body]

The golf ball according to the present invention is not particularly limited, as long as it is a golf ball comprising a golf ball body and a paint film formed on a surface of the golf ball body. The construction of the golf ball body is not particularly limited, and the golf ball body may be a one-piece golf ball, a two-piece golf ball, a three-piece golf ball, a four-piece golf ball, a multi-piece golf ball such as a five-piece golf ball and a golf ball comprising more than five pieces, or a wound golf ball. The present invention can be applied appropriately to any one of the above golf balls.

FIG. 1 is a partially cutaway view showing a golf ball 2 according to an embodiment of the present invention. The golf ball 2 comprises a spherical core 104, an intermediate layer 106 covering the spherical core 104, a cover 112 covering the intermediate layer 106. On the surface of the cover 112, a plurality of dimples 114 are formed. On the surface of the golf ball, a part other than the dimples 114 is a land 116. The golf ball further comprises a paint layer and a mark layer on the outer side of the cover, but these layers are not depicted.

The golf ball according to the present invention is preferably a golf ball comprising a core and a cover covering the core. In this case, the cover preferably has a hardness of 70 or less, more preferably 65 or less, even more preferably 60 or less, most preferably 50 or less in Shore D hardness. If the cover has a hardness of 70 or less in Shore D hardness, the spin rate on approach shots for a distance of about 40 yards to about 100 yards becomes higher, and thus controllability increases. The lower limit of the hardness of the cover is not particular limited, but it is preferably 10, more preferably 15, even more preferably 20 in Shore D hardness. The hardness of the cover is a slab hardness obtained by measuring a cover composition for forming the cover molded into a sheet form.

The cover material constituting the cover of the golf ball according to the present invention is not particularly limited, and examples thereof include various resins such as an ionomer resin, a polyester resin, a urethane resin like a thermoplastic urethane resin or a two-component curing type urethane resin, and a polyamide resin; and a thermoplastic polyamide elastomer having a trade name of "Pebax (registered trademark) (e.g. "Pebax 2533")" commercially available from Arkema Inc., a thermoplastic polyester elastomer having a trade name of "Hytrel (registered trademark) (e.g. "Hytrel 3548" and "Hytrel 4047")" commercially available from Du Pont-Toray Co., Ltd., a thermoplastic polyurethane elastomer having a trade name of "Elastollan (registered trademark) (e.g. "Elastollan XNY97A")" available from BASF Japan Ltd, and a thermoplastic styrene elastomer having a trade name of "Rabalon (registered trademark)" and a thermoplastic polyester elastomer having a trade name of "Primalloy" commercially available from Mitsubishi Chemical Corporation. These cover materials may be used solely, or two or more of these cover materials may be used in combination.

The cover may include a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer, a fluorescent material or a fluorescent brightener, or the like, in addition to the above resin component, as long as they do not impair the performance of the cover.

The embodiment for molding the cover from the cover composition is not particularly limited, and examples thereof include an embodiment comprising injection molding the cover composition directly onto the core; and an embodiment comprising molding the cover composition into hollow shells, covering the core with a plurality of the hollow shells and compression molding the core with a plurality of the hollow shells (preferably an embodiment comprising molding the cover composition into half hollow-shells, covering the core with two of the half hollow-shells and compression molding the core with two of the half hollow-shells). After the cover is molded, the obtained golf ball body is ejected from the mold, and as necessary, the golf ball body is preferably subjected to surface treatments such as deburring, cleaning, and sandblast. If desired, a mark may be formed.

The total number of the dimples formed on the cover is preferably 200 or more and 500 or less. If the total number of the dimples is less than 200, the dimple effect is hardly obtained. If the total number exceeds 500, the dimple effect is hardly obtained because the size of the respective dimples is small. The shape (shape in a plan view) of the formed dimple includes, for example, without limitation, a circle; a polygonal shape such as a roughly triangular shape, a roughly quadrangular shape, a roughly pentagonal shape, and a roughly hexagonal shape; and another irregular shape. The shape may be employed solely, or two or more of the shapes may be employed in combination.

The golf ball preferably has a diameter ranging from 40 mm to 45 mm. In light of satisfying a regulation of US Golf Association (USGA), the diameter is preferably 42.67 mm or more. In light of prevention of the air resistance, the diameter is preferably 44 mm or less, more preferably 42.80 mm or less. The golf ball preferably has a mass of 40 g or more and 50 g or less. In light of obtaining greater inertia, the golf ball more preferably has a mass of 44 g or more, even more preferably 45.00 g or more. In light of satisfying a regulation of USGA, the golf ball preferably has a mass of 45.93 g or less.

When the golf ball according to the present invention has a diameter ranging from 40 mm to 45 mm, the compression deformation amount (shrinking amount along the compression direction) of the golf ball when applying a load from 98 N as an initial load to 1275 N as a final load to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard and thus the shot feeling thereof becomes better. On the other hand, if the compression deformation amount is 4.0 mm or less, the resilience of the golf ball becomes better.

Next, the core used for a wound golf ball, two-piece golf ball and multi-piece golf ball, and the one-piece golf ball body will be explained.

The core or the one-piece golf ball body may use a conventionally known rubber composition (hereinafter simply referred to as "core rubber composition" occasionally), and may be formed by heat pressing, for example, a rubber composition containing a base rubber, a co-crosslinking agent and a crosslinking initiator.

As the base rubber, particularly preferred is a high cis-polybutadiene having a cis-bond in a proportion of 40 mass % or more, more preferably 70 mass % or more, and even more preferably 90 mass % or more in view of its advantageous resilience. As the co-crosslinking agent, an $\alpha,\beta$-unsaturated carboxylic acid having 3 to 8 carbon atoms or a metal salt thereof is preferable, and a metal salt of acrylic acid or a metal of methacrylic acid is more preferable. As the metal constituting the metal salt, zinc, magnesium, calcium, aluminum or sodium is preferable, and zinc is more preferable. The amount of the co-crosslinking agent to be used is preferably 20 parts by mass or more and 50 parts by mass or less, with respect to 100 parts by mass of the base rubber. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferably used. The amount of the crosslinking initiator to be used is preferably 0.2 part by mass or more, more preferably 0.3 part by mass or more, and is preferably 3 parts by mass or less, more preferably 2 parts by mass or less, with respect to 100 parts by mass of the base rubber. In addition, the core rubber composition may further include an organic sulfur compound. As the organic sulfur compound, diphenyl disulfides, thiophenols or thionaphthols may be preferably used. The amount of the organic sulfur compound to be used is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further include a carboxylic acid and/or a salt thereof. As the carboxylic acid and/or the salt thereof, a carboxylic acid having 1 to 30 carbon atoms and/or a salt thereof is preferred. The amount of the carboxylic acid and/or the salt thereof to be used is preferably 1 part by mass or more and 40 parts by mass or less, with respect to 100 parts by mass of the base rubber.

The core rubber composition may further include a weight adjusting agent such as zinc oxide and barium sulfate, an antioxidant, or a colored powder, in addition to the base rubber, the co-crosslinking agent, the crosslinking initiator, and the organic sulfur compound. The molding conditions for heat pressing the core rubber composition may be determined appropriately depending on the rubber formulation. Generally, the heat pressing is preferably carried out at 130° C. to 200° C. for 10 to 60 minutes, or carried out in a two-step heating of heating at 130° C. to 150° C. for 20 to 40 minutes followed by heating at 160° C. to 180° C. for 5 to 15 minutes.

[Golf Ball]

In the case that the golf ball according to the present invention is a three-piece golf ball, a four-piece golf ball, and a multi-piece golf ball such as a five-piece golf ball and a golf ball comprising more than five pieces, examples of the material for an intermediate layer disposed between the core and the outmost cover include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product obtained by neutralizing, with a metal ion, at least a part of carboxyl groups in a copolymer composed of ethylene and an α,β-unsaturated carboxylic acid; and a product obtained by neutralizing, with a metal ion, at least a part of carboxyl groups in a terpolymer composed of ethylene, an α,β-unsaturated carboxylic acid and an α,β-unsaturated carboxylic acid ester. The intermediate layer may further include a weight adjusting agent such as barium sulfate and tungsten, an antioxidant, and a pigment. The intermediate layer may be referred to as an inner cover layer or an outer core depending on the construction of the golf ball.

The golf ball according to the present invention comprises a golf ball body and a paint film formed on a surface of the golf ball body, and preferably has a coefficient of friction (dry) of 0.48 or more and 0.60 or less calculated using a contact force tester.

In the present invention, the coefficient of friction calculated using the contact force tester is a coefficient of friction between the golf ball and a collision plate when the golf ball is allowed to collide with the collision plate disposed inclined at a predetermined angle to the flying direction of the golf ball. By using the contact force tester, a time function $Fn(t)$ of contact force in a direction perpendicular to the collision plate and a time function $Ft(t)$ of contact force in a direction parallel to the collision plate are concurrently measured, and a maximum value of a time function $M(t)$ which is a ratio of $Ft(t)$ to $Fn(t)$ represented by the following equation is defined as a coefficient of friction.

$$M(t)=Ft(t)/Fn(t)$$

Figure 2:
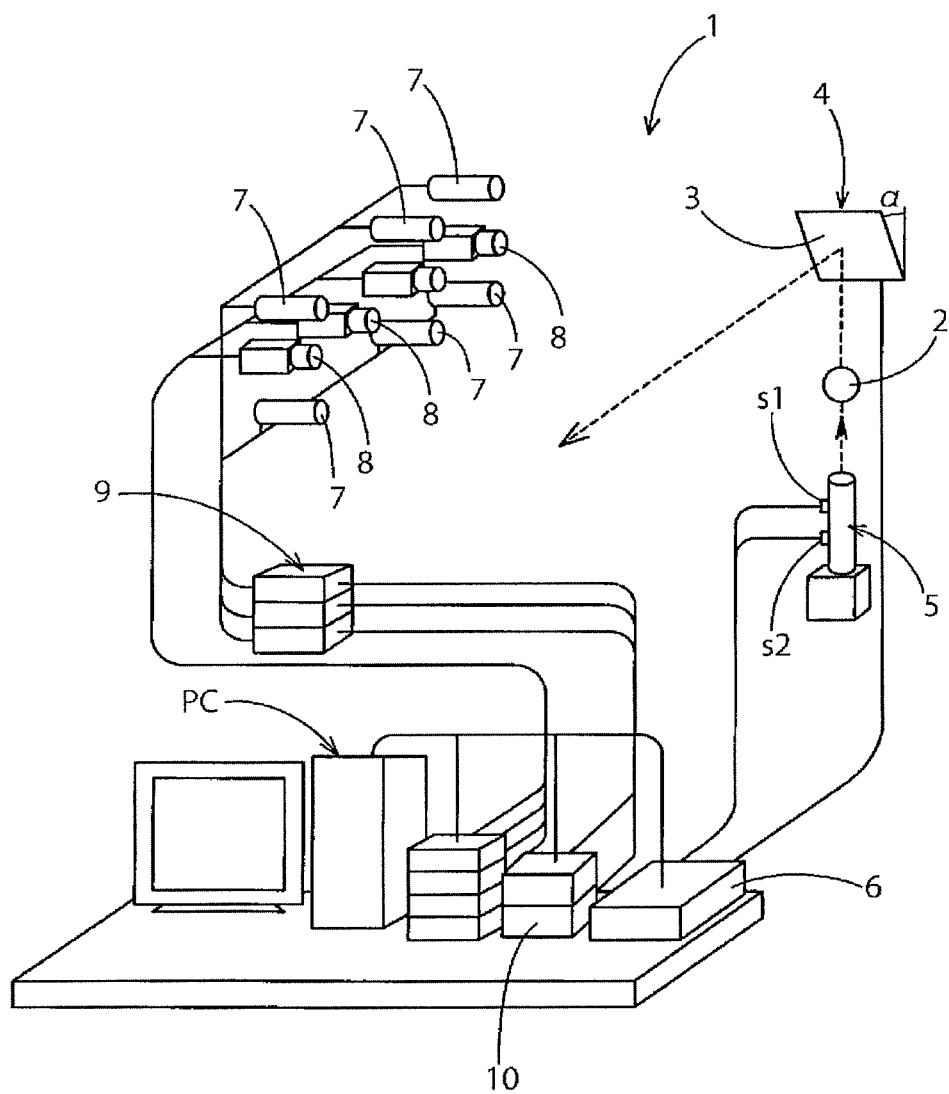
FIG. 2 is a schematic view of an example of a contact force tester used in the present invention.
Figure 3:
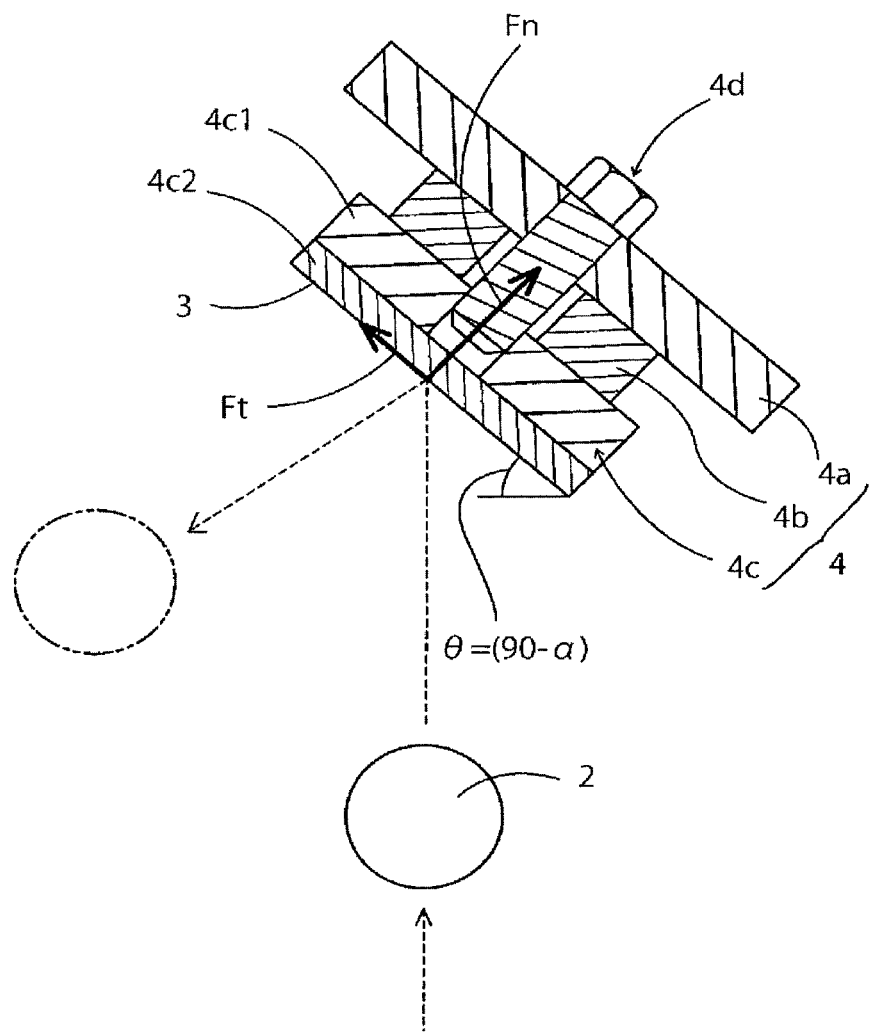
FIG. 3 is a partially enlarged cross-sectional view of a collision plate of the contact force tester.

In the present invention, the method of calculating the coefficient of friction will be described based on FIG. 2 to FIG. 4. FIG. 2 is a contact force tester for measuring the coefficient of friction. FIG. 3 is an enlarged cross-sectional view of a collision plate 4 that the golf ball is allowed to collide with.

The contact force tester 1 makes pseudo conditions of hitting a golf ball with a club face, and enables to measure various forces at that time. The contact force tester 1 includes, for example, a launcher 5 launching a golf ball 2 in an upward and perpendicular direction, and a collision plate 4 positioning on the upper side of the launched golf ball 2 and having a striking face 3 that the golf ball 2 collides with.

Since a distance between the launcher 5 and the striking face 3 is relatively short, an initial velocity of the golf ball 2 corresponds to a collision velocity. This collision velocity corresponds to a head speed of a club head in an actual golf swing. In view of this point, the collision velocity of the golf ball 2 to the striking face 3 may be set, for example, within the range of about 10 m/s to about 50 m/s. In the present invention, in light of the head speed of approach shots, the initial velocity is set to 19 m/s.

The desired value of the initial velocity of the golf ball 2 is set by the volume of a controller 6 or the like. Based on a distance between a first sensor S1 and a second sensor S2 provided in the launcher 5 and a time difference between interrupting these sensors, the controller 6 calculates the actually measured value of the initial velocity of the golf ball 2, and outputs the value to a computer device PC or the like.

FIG. 3 shows a partially enlarged cross-sectional view of the collision plate 4. The collision plate 4 can incline the striking face 3 at a predetermined angle α to the launching direction (flying direction) of the golf ball 2. In the present invention, an angle θ obtained by subtracting the angle α from 90 degree is defined as a collision angle. This collision angle θ corresponds to a loft angle of a club face (not shown) in an actual swing. Further, in view of the loft angle of a golf club, the collision angle θ is set to a plurality of values (e.g. 15°, 20°, 35° and the like), for example, within a range from 10° to 90°, and the measurement of the contact force, which will be described later, can be conducted at each angle. In the present invention, the collision angle θ is set to 55° in order to recreate the spin rate on approach shots.

The collision plate 4 comprises, for example, a base plate 4a formed from a metal plate material, a superficial plate 4c constituting the striking face 3, and a pressure sensor 4b interposed therebetween, which are fixed to one another with a bolt 4d integrally.

The base plate 4a may be formed from any material without particular limitation, as long as it has a predetermined strength and rigidity, but preferably formed from steel. The base plate 4a preferably has a thickness in a range from 5.0 mm to 20.0 mm. A model number of the main bolt 4d is, for example, M10 according to JIS.

As the pressure sensor 4b, for example, a 3-component force sensor is preferably used. Such sensor can measure, at least, a perpendicular force Fn in a direction perpendicular to the striking face 3, and a shear force Ft in a direction parallel to the striking face 3 (a direction from the sole side toward the crown side in a club face) as time-series data. The measurement of the force is conducted by connecting a charge amplifier or the like to the pressure sensor 4b.

As the pressure sensor 4b, a variety of products may be used, for example, a 3-component force sensor (model 9067) manufactured by Kistler Instrument Corporation can be used. This sensor enables to measure force components in a parallel direction, a Y direction and a perpendicular direction. Although not illustrated, the measurement of the pressure is conducted by connecting a charge amplifier (model 5011B manufactured by Kistler Instrument Corporation) to the pressure sensor 4b. The pressure sensor 4b is formed in its center with a through-hole through which the main bolt 4d is inserted to integrally fix the pressure sensor 4b to the base plate 4a.

The superficial plate 4c is composed of a main body 4c1 and a superficial material 4c2 disposed outside of the main body 4c1 to provide the striking face 3 and having an area large enough to collide with the golf ball 2. These are fixed with a bolt or the like, which is not illustrated, in a detachable manner. Accordingly, by appropriately changing the material, planner shape and/or surface structure of the superficial material 4c2, it is possible to create approximate models of various kinds of club faces and to measure the contact force thereof.

The main body 4c1 may be formed from any material without limitation, but typically formed from stainless steel (SUS-630). The thickness of the main body 4c1 is typically in a range from 10 mm to 20 mm. Further, the main body 4c1 may have a substantially same planner shape as the pressure sensor 4b, for example, a square shape with a length of 40 mm to 60 mm on one side. Into the main body 4c1, the front end of the main bolt 4d is screwed. As a result, the pressure sensor 4b is interposed between the base plate 4a and the main body 4c1, and the position thereof is fixed.

The superficial material 4c2 providing the striking face 3 of the collision plate 4 may adopt various materials, planner shapes and surface structures, however, it is preferably formed from the same material as the face (not shown) of the golf club head which has been set as an analysis subject beforehand. In the present invention, in view of evaluating a model of approach shots, SUS-431 stainless steel which is the same material as the head material of CG-15 manufactured by Cleveland Golf is used as the superficial material 4c2. The thickness of the superficial material 4c2 may be arbitrarily changed, for example, within a range of 1.0 mm to 5.0 mm. The planner shape of the superficial material 4c2 may be substantially the same as that of the main body 4c1, for example, a square shape with a length of 40 mm to 60 mm on one side.

The contact force tester 1 comprises a strobe device 7 and a high speed type camera device 8 enabling to take a photograph of the collision between the golf ball 2 and the striking face 3 as well as the golf ball 2 rebounding from the striking face 3. The strobe device 7 is connected to a strobe power 9. The camera device 8 is connected to a camera power 10 via a capacitor box. The imaged data is memorized in the computer device PC or the like. By comprising these devices, a slipping velocity and a contact area at the time of the collision between the golf ball 2 and the striking face 3, and a launch speed, a launch angle and a backspin rate of a golf ball, which will be explained later, can be measured.

Figure 4:
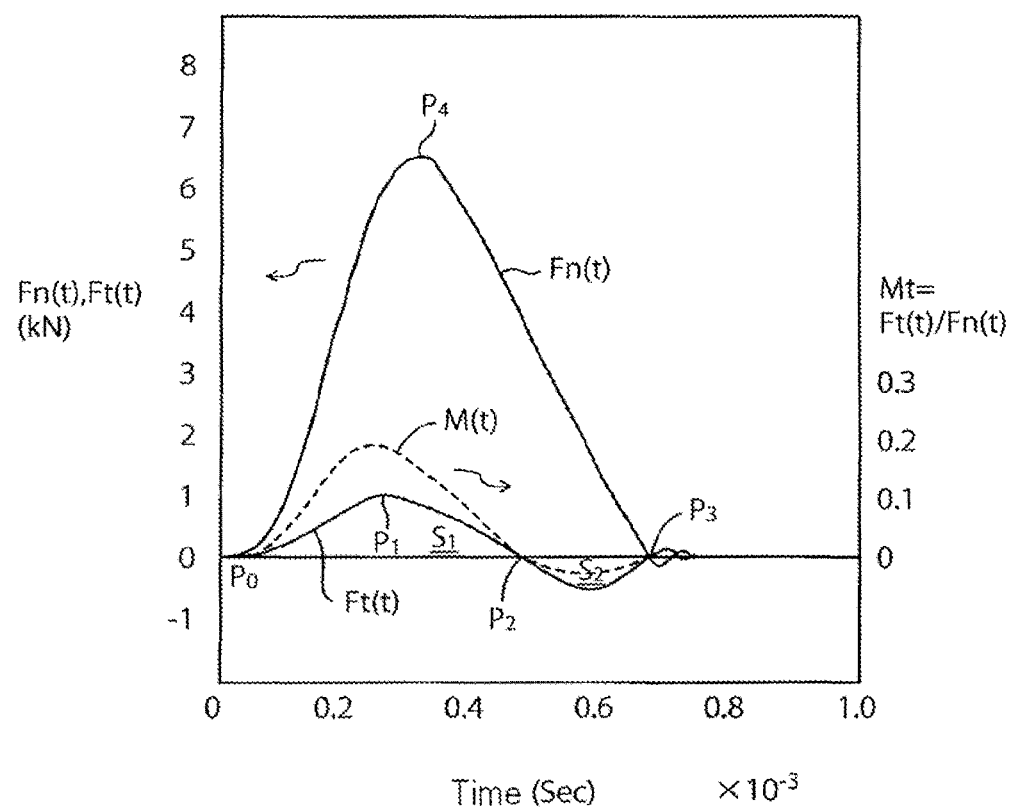
FIG. 4 is a graph illustrating an example of Ft(t), Fn(t) and M(t)

FIG. 4 shows a time history of the perpendicular force Fn and the shear force Ft applied to the striking face 3 at the time of the collision by the golf ball 2 measured with the contact force tester 1 under a specific condition.

FIG. 4 is a graph illustrating an example of Fn(t) and Ft(t) measured with the tester shown in FIGS. 2 and 3. In FIG. 4, a point P0 represents a point where the pressure sensor 4b starts sensing force, and generally corresponds to the point at which the striking face 3 and the golf ball 2 come into collision with each other. Fn(t) which is a contact force in the perpendicular direction gradually increases from the point P0, peaks at a point P4, and comes down therefrom to reach zero at a point P3. The point P3 represents a point where the pressure sensor 4b no longer senses force, and generally corresponds to the point where the golf ball 2 leaves the striking face 3.

On the other hand, the value of Ft(t) which is a contact force (i.e., shear force) in the direction parallel to the collision plate increases with time from the point P0, peaks at a point P1, and comes down therefrom to reach zero at a point P2 after which it takes a negative value. Since the golf ball leaves the pressure sensor 4b at the point P3, the curve of Ft(t) sensed by the pressure sensor 4b takes zero at the point P3. An area S1 of the region where Ft(t) takes a positive value within the region surrounded by the curve of Ft(t) and the time axis represents impulse where the shear force is positive. On the other hand, an area S2 of the region where Ft(t) takes a negative value within the region surrounded by the curve of Ft(t) and the time axis represents impulse where the shear force is negative. Impulse S1 acts in a direction promoting back spin, and impulse S2 acts in a direction inhibiting back spin. Here, impulse S1 takes a larger value than impulse S2, and a value obtained by subtracting impulse S2 from impulse S1 contributes to back spin of a golf ball.

A coefficient of friction can be obtained by calculating a maximum value of M(t) which is expressed by Ft(t)/Fn(t).

In the present invention, the coefficient of friction (dry) obtained as described above is preferably 0.48 or more, more preferably 0.49 or more, even more preferably 0.50 or more, and is preferably 0.60 or less, more preferably 0.58 or less, even more preferably 0.56 or less. If the coefficient of friction falls within the above range, the spin rate on approach shots becomes better.

Further, in the present invention, when measuring the coefficient of friction as described above, a wet paper having slits formed thereon is attached on the surface of the collision plate, and the measured coefficient of friction (wet paper slit) is preferably 0.18 or more, more preferably 0.19 or more. The coefficient of friction (wet paper slit) measured by attaching the wet paper can be used to evaluate controllability on approach shots from the rough. If the coefficient of friction (wet paper slit) falls within the above range, the golf ball according to the present invention is also excellent in controllability on approach shots from the rough.

EXAMPLES

Hereinafter, the present invention will be described in detail by way of examples. However, the present invention is not limited to the examples described below, and various changes and modifications without departing from the gist of the present invention are included in the scope of the present invention.

[Evaluation Method]
(1) Measurement of Coefficient of Friction (Dry)
The contact force tester shown in FIG. 2 was used to measure the coefficient of friction (dry) of the golf ball.
1. Specification of Tester
  (A) Launcher: air gun system
  (B) Collision plate:
  Base plate 4a
  Steel
  Thickness: 5.35 mm
  Superficial plate 4c
  Main body 4c1
  Size: 56 mm×56 mm×15 mm
  Stainless steel (SUS-630)
  Superficial material 4c2
  Size: 56 mm×56 mm×2.5 mm
  Metal composition: SUS-431
  Groove shape: see FIG. 5
  Angle of inclination (α)
  35 degrees (to flying direction of golf ball)
  (C) Pressure sensor 4b
  3-component force sensor (model 9067) available from Kistler Instrument Corporation
  Charge amplifier
  Model 5011B available from Kistler Instrument Corporation
  (D) Capture of contact force into PC
  A pulse counter board PCI-6101 (manufactured by Interface Corporation) was used. With a 16-bit PCI pulse counter board having 4 channels, measurement suited for a specific application may be realized in four counter modes. The maximum input frequency is 1 MHz.

Figure 5:
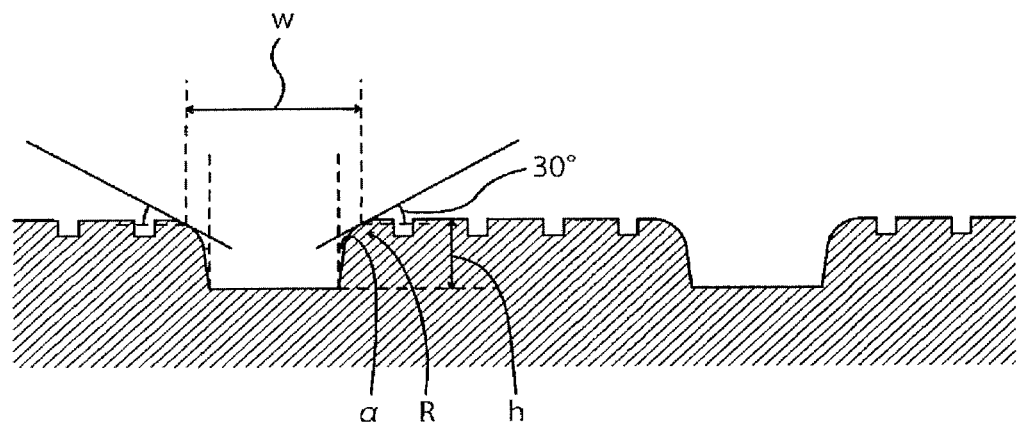
FIG. 5 is a cross-sectional view of a groove shape of a surface layer material of the contact force tester.
Figure 5:
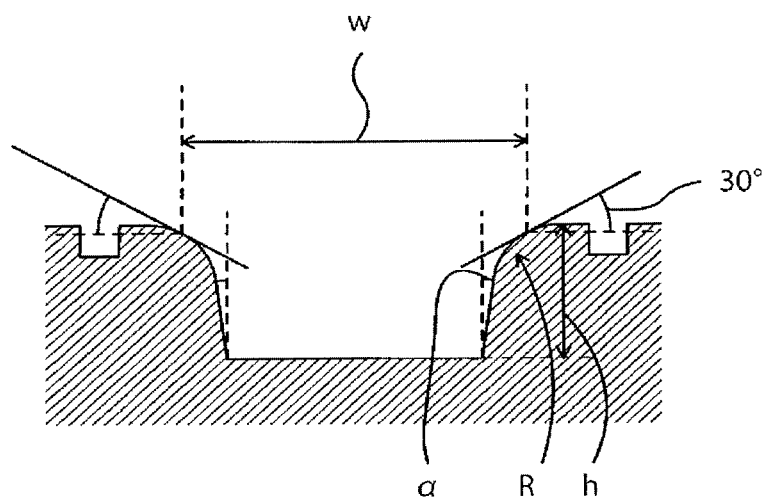

As shown in FIG. 5, the groove structure of a sand wedge CG-15 available from Cleveland Golf is reproduced on the striking face 3 of the collision plate 4. As shown in FIG. 5(a), on the striking face 3, large grooves (zip grooves) are formed, and a plurality of small grooves are formed on the surface between the large grooves (zip grooves).

FIG. 5 (b) is an enlarged view of cross-section structure of the zip groove. The dimensions of the zip groove are as follow.
  Zip groove (groove) width W: 0.70 mm
  Zip groove (groove) depth h: 0.50 mm
  Zip groove (groove) pitch: 3.56 mm
  Zip groove (groove) angle α: 10°
  Zip groove shoulder R: 0.25

A plurality of small grooves between the zip grooves are formed by a laser-milling method such that the surface portion between the zip grooves has a surface roughness Ra=2.40±0.8 μm and Rmax=14.0±8 μm. It is noted that the surface roughness Ra and Rmax are measured by using SJ-301 manufactured by Mitsutoyo Corporation under the conditions of specimen length=2.5 mm and cut off value=2.5 mm.

(2) Measuring Procedure

The coefficient of friction was measured according to the following method.

(a) Setting the angle (α) of the collision plate at 35 degrees to the flying direction (vertical direction) of the golf ball;

(b) Adjusting the air pressure of the launcher 5;

(c) Launching the golf ball from the launcher (launch speed: 19 m/s);

(d) Measuring the initial velocity of the golf ball from the preset distance between the sensor S1 and sensor S2 and the time difference between the times for the golf ball to interrupt the sensors S1 and S2;

(e) Measuring the contact force Fn(t) and contact force Ft(t), and calculating the maximum value of Ft(t)/Fn(t).

(3) Result of Measurement

Figure 6:
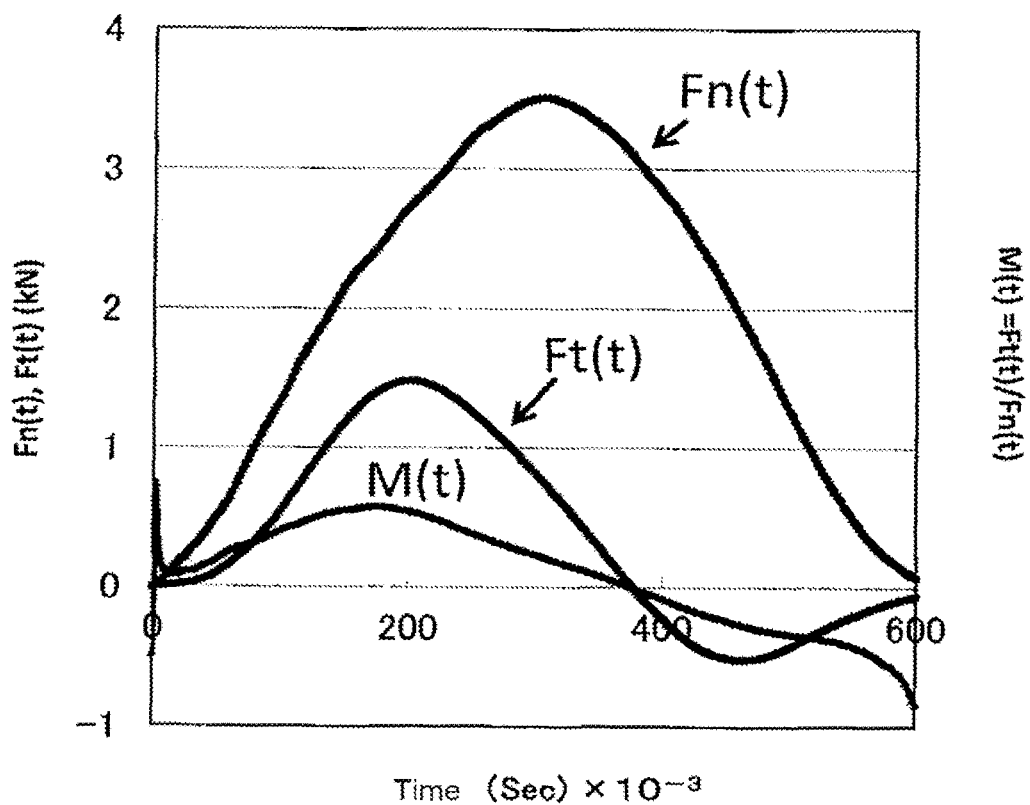
FIG. 6 is a graph illustrating an example of Ft(t), Fn(t) and M(t)

One example of the results obtained with the above tester in the above measuring procedure is shown in FIG. 6. From FIG. 6, the value of M(t) was calculated as Ft(t)/Fn(t), and the maximum value thereof was 0.58. Since noise tends to generate in initial period where the contact force rises up and in terminal period for measuring Ft and Fn, the maximum value of M(t) was calculated after trimming an early stage of the initial period and late stage of the terminal period.

(2) Measurement of Coefficient of Friction (Wet Paper Slit)

Figure 7:
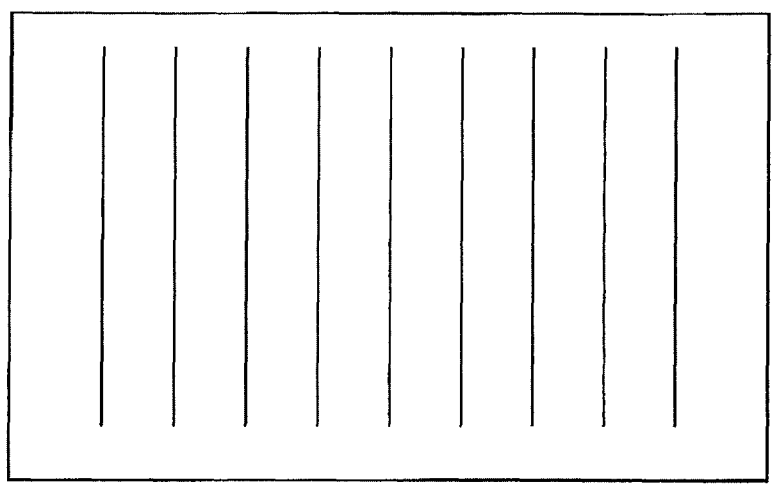
FIG. 7 is an explanatory drawing illustrating an embodiment of forming slits on a wet paper when measuring a coefficient of friction (wet)

As shown in FIG. 7, slits were formed at an interval of 5 mm on Sontar maintenance cloth thick type (size: 56 mm×56 mm) manufactured by E. I. du Pont de Nemours and Company, and the cloth was wetted with water and attached on the collision plate. At this time, the cloth was attached such that the grooves formed on the collision plate and the slits are perpendicular to one another. Except that the launch speed of the golf ball was changed to 9 m/s, the coefficient of friction (wet paper slit) and spin rate were measured by the same method and under the same conditions as those in the measurement of the coefficient of friction (dry). It is noted that the spin rate is represented by a spin rate difference obtained by subtracting the spin rate of Golf ball No. 9 from that of each golf ball.

(3) Mechanical Properties of Paint Film

A paint obtained by blending the base material and curing agent was dried and cured at 40° C. for 4 hours to prepare a paint film. According to JIS-K7161, this paint film was punched as a dumbbell shape to prepare a test piece, and the physical properties of the test piece were measured by using a tensile tester manufactured by Shimadzu Corporation, and the elastic modulus of the test piece at 10% elongation was calculated.

Thickness of test piece: 0.05 mm

Tension speed: 50 mm/min (4) Spin Rate and Launch Angle on Approach Shots for Less than 40 Yards A sand wedge (CG 15 forged wedge (52°) available from Cleveland Golf) was installed on a swing robot M/C manufactured by True Temper Sports, Inc. The golf ball was hit at a head speed of 21 m/sec, and the spin rate (rpm) thereof was measured by continuously taking a sequence of photographs of the hit golf ball. This measurement was conducted ten times for each golf ball, and the average value thereof was adopted as the spin rate. The launch angle was determined by measuring, with a unidimensional CCD sensor, the shadow of the ball passing through a light screen that was emitted from a linear laser light source located in front of the direction of hitting the ball with the swing robot M/C. The launch angle and spin rate are represented by a difference obtained by subtracting the launch angle and spin rate of Golf ball No. 9 from those of each golf ball.

(5) Shot Feeling

An actual hitting test was carried out by ten amateur golfers (high skilled persons) using a sand wedge (CG 15 forged wedge (52°) available from Cleveland Golf). In accordance with the number of people who answered the shot feeling was good (feeling like that the golf ball was lifted on the club face, feeling like that the golf ball gripped on the club surface, feeling like that the spin was imparted, feeling like that the golf ball was stuck on the club face, etc.), the golf balls were evaluated as follows.

E (Excellent): 9 or more

G (Good): 6 to 8

F (Fair): 3 to 5

P (Poor): 2 or less (6) Compression Deformation Amount (mm)

The deformation amount of the core or golf ball along the compression direction (shrinking amount of the core or golf ball along the compression direction), when applying a load from 98 N as an initial load to 1275 N as a final load to the core or golf ball, was measured.

[Production of Three-Piece Golf Ball]

(1) Production of Spherical Core

The core rubber composition having the formulation shown in Table 1 was mixed and kneaded, and heat-pressed in upper and lower molds, each having a hemispherical cavity, at 170° C. for 20 minutes to obtain the spherical core having a diameter 39.7 mm.

TABLE 1

| Core composition | Parts by mass |
|---|---|
| Polybutadiene rubber | 100 |
| Zinc acrylate | 38 |
| Zinc oxide | 5 |
| Barium sulfate | Appropriate amount*) |
| Diphenyl disulfide | 0.5 |
| Dicumyl peroxide | 0.8 |
| Diameter (mm) | 39.7 |
| Surface hardness (Shore D) | 58 |
| Center hardness (Shore D) | 41 |
| Compression deformation amount (mm) | 2.7 |

*)Adjustment was made such that the golf ball had a mass of 45.3 g.

Polybutadiene rubber: "BR730 (high cis-polybutadiene)" manufactured by JSR Corporation Zinc acrylate: ZN-DA90S (product of 10% zinc stearate coating) manufactured by Nihon Jyoryu Kogyo Co., Ltd.

Zinc oxide: "Ginrei R" manufactured by Toho Zinc Co., Ltd.

Barium sulfate: "Barium Sulfate BD" manufactured by Sakai Chemical Industry Co., Ltd.

Diphenyl disulfide: manufactured by Sumitomo Seika Chemicals Co., Ltd.

Dicumyl peroxide: "Percumyl (register trademark) D" manufactured by NOF Corporation (2) Preparation of Intermediate Layer Composition and Cover Composition The materials having the formulations shown in Tables 2, 3 were mixed with a twin-screw kneading extruder to prepare the intermediate layer composition and cover composition in a pellet form. The extruding conditions were a screw diameter of 45 mm, a screw rotational speed of 200 rpm, and screw L/D=35, and the mixtures were heated to 200° C. to 260° C. at the die position of the extruder.

TABLE 2

| Intermediate layer composition | Parts by mass |
|---|---|
| Himilan 7337 | 50 |
| Himilan AM7329 | 50 |
| Slab hardness (Shore D) | 65 |

Himilan 7337: zinc ion neutralized ethylene-methacrylic acid copolymer ionomer resin manufactured by Du Pont-Mitsui Polychemicals Co., Ltd.

Himilan AM7329: sodium ion neutralized ethylene-methacrylic acid copolymer ionomer resin manufactured by Du Pont-Mitsui Polychemicals Co., Ltd.

TABLE 3

| Cover composition | Parts by mass |
|---|---|
| Elastollan XNY85A | 100 |
| Titanium oxide | 4 |
| Slab hardness (Shore D) | 32 |

Elastollan XNY85A: thermoplastic polyurethane elastomer (Shore D hardness: 32) manufactured by BASF Japan Ltd (3) Production of Intermediate Layer The intermediate layer composition obtained above was directly injection molded on the spherical core obtained as described above to produce the intermediate layer. Upper and lower molds for molding have a hemispherical cavity and a retractable hold pin holding the spherical core. When molding the intermediate layer, the hold pin was protruded to hold the spherical core after the spherical core was charged, and the intermediate layer composition heated to 260° C. was charged for 0.3 second into the mold held under a pressure of 80 tons, and cooled for 30 seconds to mold the intermediate layer (thickness: 1 mm).

(4) Molding of Half Shell

The compression molding of the half shells was conducted by charging a pellet of the cover composition into each of the depressed part of the lower mold for molding half shells, and applying pressure to mold half shells. The compression molding was conducted under the conditions of a molding temperature of 170° C., a molding time of 5 minutes and a molding pressure of 2.94 MPa.

(5) Molding of Cover

The spherical body having the intermediate layer covered thereon and obtained in (3) was concentrically covered with two of the half shells obtained in (4), and the spherical body and two of the half shells were compression molded to obtain the cover (thickness: 0.5 mm). The compression molding was conducted under the conditions of a molding temperature of 145° C., a molding time of 2 minutes and a molding pressure of 9.8 MPa.

(6) Preparation of Paint

Figure 8:
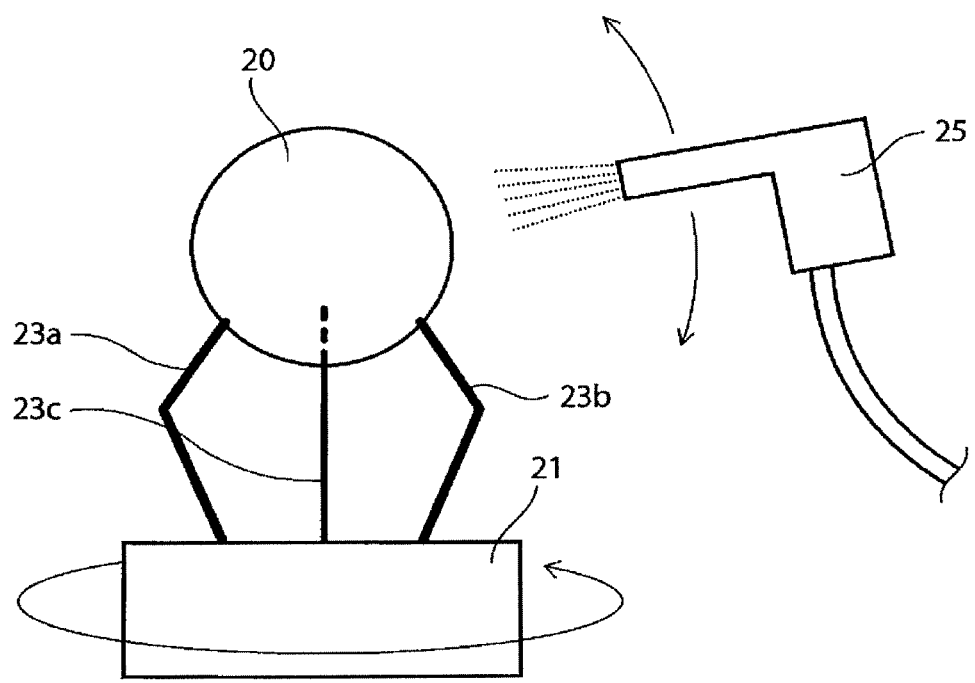
FIG. 8 is a schematic view showing an embodiment of painting with an air gun.

The materials shown in Table 4 were blended to prepare the paint compositions. The surface of the golf ball body obtained above was subjected to a sandblast treatment, and a mark was formed thereon. Then, the paint was applied to the golf ball body with a spray gun, and the paint was dried in an oven of 40° C. for 24 hours to obtain the golf ball having a diameter of 42.7 mm and a mass of 45.3 g. The thickness of the paint film was set in a range of from 20 μm to 40 μm. The golf ball body was placed in a rotating member shown in FIG. 8, the rotating member was allowed to rotate at 300 rpm, and application of the paint was conducted by spacing a spray distance (7 cm) between the air gun and the golf ball body while moving the air gun in an up and down direction. The painting interval in the overpainting operation was set to 1.0 second. Application of the paint was conducted under the air gun spraying conditions of a spraying air pressure: 0.15 MPa, a compressed air tank pressure: 0.10 MPa, a painting time for one application: 1 second, an atmosphere temperature: 20° C. to 27° C., and an atmosphere humidity: 65% or less. Results evaluating the spin performance of the obtained golf balls are shown in Table 4.

TABLE 4

| | | Golf ball No. | | | | |
|---|---|---|---|---|---|---|
| | | 1 | 2 | 3 | 4 | 5 |
| Base material formulation (parts by mass) | Polyrotaxane | — | 36 | 50 | 70 | 100 |
| | Polycaprolactone polyol | 56 | 36 | 28 | 17 | — |
| | Modified product of vinyl chloride-vinyl acetate copolymer | 44 | 28 | 22 | 13 | — |
| | Modified silicone | 0.1 | 0.10 | 0.1 | 0.1 | 0.1 |
| | Dibutyl tin dilaurate | 0.01 | 0.01 | 0.01 | 0.01 | 0.01 |
| | Solvent | 100 | 100 | 100 | 100 | 100 |
| | Polyn #950 | — | — | — | — | — |
| Curing agent formulation (parts by mass) | HDI biuret-modified product | — | — | — | — | — |
| | HDI isocyanurate | 100 | 100 | 100 | 100 | 100 |
| | IPDI isocyanurate | — | — | — | — | — |
| | Solvent | 100 | 100 | 100 | 100 | 100 |
| Mixing ratio of curing agent/base material (NCO/OH molar ratio) | | 1.2/1.0 | 1.2/1.0 | 1.2/1.0 | 1.2/1.0 | 1.2/1.0 |
| 10% elastic modulus of paint film (kgf/cm$^2$) | | 35 | 8 | 8 | 8 | 8 |
| Physical properties of golf ball | Compression deformation amount (mm) | 2.65 | 2.65 | 2.65 | 2.65 | 2.65 |
| | Spin rate of golf ball (rpm) | 370 | 480 | 520 | 550 | 590 |
| | Launch angel (°) | −1.72 | −1.98 | −2.06 | −2.21 | −2.39 |
| | Coefficient of friction (dry) | 0.42 | 0.49 | 0.51 | 0.54 | 0.57 |
| | Coefficient of friction (wet paper slit) | 0.13 | 0.20 | 0.24 | 0.24 | 0.23 |
| | Spin rate difference (wet paper slit) | 90 | 570 | 680 | 675 | 620 |
| | Shot feeling | E | E | E | E | E |

| | | Golf ball No. | | | | |
|---|---|---|---|---|---|---|
| | | 6 | 7 | 8 | 9 | 10 |
| Base material formulation (parts by mass) | Polyrotaxane | — | — | — | — | — |
| | Polycaprolactone polyol | — | — | — | — | — |
| | Modified product of vinyl chloride-vinyl acetate copolymer | — | — | — | — | — |

TABLE 4-continued

| | | | | | | |
|---|---|---|---|---|---|---|
| | Modified silicone | — | — | — | — | — |
| | Dibutyl tin dilaurate | — | — | — | — | — |
| | Solvent | — | — | — | — | — |
| | Polyn #950 | 100 | 100 | 100 | 100 | 100 |
| Curing agent formulation (parts by mass) | HDI biuret-modified product | 30 | 30 | 30 | 30 | 30 |
| | HDI isocyanurate | 30 | 30 | 30 | 30 | 30 |
| | IPDI isocyanurate | 40 | 40 | 40 | 40 | 40 |
| | Solvent | 100 | 100 | 100 | 100 | 100 |
| Mixing ratio of curing agent/base material (NCO/OH molar ratio) | | 0.38/1.0 | 0.5/1.0 | 0.8/1.0 | 1.2/1.0 | 1.6/1.0 |
| 10% elastic modulus of paint film (kgf/cm$^2$) | | 8 | 38 | 126 | 186 | 275 |
| Physical properties of golf ball | Compression deformation amount (mm) | 2.65 | 2.65 | 2.65 | 2.65 | 2.65 |
| | Spin rate of golf ball (rpm) | 390 | 360 | 255 | 0 | −75 |
| | Launch angel (°) | −1.64 | −1.44 | −1.01 | 0 | 0.29 |
| | Coefficient of friction (dry) | 0.46 | 0.42 | 0.38 | 0.32 | 0.28 |
| | Coefficient of friction (wetted paper slit) | 0.17 | 0.16 | 0.15 | 0.13 | 0.11 |
| | Spin rate difference (wetted paper slit) | 300 | 220 | 160 | 0 | −80 |
| | Shot feeling | E | G | G | F | P |

The raw materials used in Table 4 are shown below.

Base Material

Polyrotaxane: "SeRM (registered trademark) super polymer SH3400P (a polyrotaxane having a cyclodextrin, at least a part of hydroxyl groups thereof being modified with a caprolactone chain via —O—C$_3$H$_6$—O— group, a linear molecule of polyethylene glycol and a blocking group of an adamantyl group; molecular weight of linear molecule: 35,000, hydroxyl value: 72 mg KOH/g, total molecular weight of polyrotaxane: 700,000 in weight average molecular weight) manufactured by Advanced Softmaterials Inc.

Polycaprolactone polyol: Placcel 308 manufactured by Daicel Chemical Industries, Ltd.

Modified product of vinyl chloride-vinyl acetate copolymer: Solbin AL (hydroxyl-modified vinyl chloride-vinyl acetate copolymer) manufactured by Nissin Chemical Industry Co., Ltd.

Modified silicone: DBL-C31 manufactured by Gelest, Inc.

Solvent: mixed solvent of xylene/methylethyl ketone=70/30 (mass ratio)

Polin #950: urethane polyol having a hydroxyl value of 128 mg KOH/g and formed from a polyol component (trimethylolpropane and polyoxytetramethylene glycol) and a polyisocyanate component (isophorone diisocyanate), manufactured by Shinto Paint Co., Ltd.

Curing Agent

Isocyanurate of hexamethylene diisocyanate (HDI isocyanurate): Duranate TKA-100 (NCO content: 21.7%) manufactured by Asahi Kasei Chemicals Corporation Biuret-modified product of hexamethylene diisocyanate (HDI biuret-modified product): Duranate 21S-75E (NCO content: 15.5%) manufactured by Asahi Kasei Chemicals Corporation Isocyanurate of isophorone diisocyanate (IPDI isocyanurate): VESTANAT T1890 (NCO content: 12.0%) manufactured by Degussa Co., Ltd.

Solvent: methylethyl ketone

It is apparent from the results of Table 4 that the following golf ball shows low launch angle and high spin rate on approach shots for less than 40 yards, in particular, on approach shots around the green (about 10 yards to 20 yards), and thus exhibits excellent controllability. Said golf ball comprises a golf ball body and a paint film formed on a surface of the golf ball body, wherein the paint film is formed from a paint composition including a polyisocyanate and a polyrotaxane, and wherein the polyrotaxane has a cyclodextrin, a linear molecule piercing through the cyclic structure of the cyclodextrin, and having blocking groups located at both ends of the linear molecule to prevent disassociation of the cyclodextrin.

The present invention is useful for painted golf balls. This application is based on Japanese patent application No. 2014-232205 filed on Nov. 14, 2014, the content of which is hereby incorporated by reference.

The invention claimed is:

1. A golf ball comprising a golf ball body and a paint film formed on a surface of the golf ball body,
    wherein the paint film is formed from a curing type paint composition including:
    a base material containing a polyrotaxane, and a curing agent containing a
    polyisocyanate; and
    wherein the polyrotaxane comprises a cyclodextrin, and a linear molecule included in the cyclodextrin cyclic structure in a manner of piercing through the cyclic structure of the cyclodextrin, the linear molecule having blocking groups located at both ends of the linear molecule to prevent disassociation of the cyclodextrin, and at least a portion of the cyclodextrin hydroxyl groups being modified with a caprolactone chain expressed by —(CO(CH$_2$)$_5$O)nH via a —O—C$_3$H$_6$—O— group, wherein n represents the degree of polymerization and is a natural number of 2 to 70; and
    wherein the polyisocyanate includes an isocyanurate-modified product of hexamethylene diisocyanate.

2. The golf ball according to claim 1, wherein n is a natural number of 3 to 40.

3. The golf ball according to claim 1, wherein a resin component of the base material contains the polyrotaxane in an amount of 10 mass % or more and 100 mass % or less.

4. The golf ball according to claim 1, wherein the base material further contains at least one polyol selected from the group consisting of a polyether polyol, a polyester polyol, a polycaprolactone polyol, a polycarbonate polyol, and an acrylic polyol.

5. The golf ball according to claim 4, wherein a resin component of the base material contains the at least one polyol in an amount of 5 mass % or more and 90 mass % or less.

6. The golf ball according to claim 4, wherein the at least one polyol includes the polycaprolactone polyol.

7. The golf ball according to claim 1, wherein the linear molecule is polyethylene glycol, and the blocking group is an adamantyl group.

8. The golf ball according to claim 1, wherein the curing type paint composition further includes a vinyl chloride-vinyl acetate copolymer and/or a modified product thereof.

9. The golf ball according to claim 8, wherein the vinyl chloride-vinyl acetate copolymer and/or the modified product thereof includes a hydroxyl group-modified vinyl chloride-vinyl acetate copolymer.

10. The golf ball according to claim 8, wherein the vinyl chloride-vinyl acetate copolymer and/or the modified product thereof is included in an amount of 4 mass % or more and 50 mass % or less in the resin component of the base material.

11. The golf ball according to claim 1, wherein the curing type paint composition further includes a modified silicone.

12. The golf ball according to claim 11, wherein the modified silicone is included in an amount of 0.01 part by mass or more and 10 parts by mass or less with respect to 100 parts by mass of the resin component of the base material.

13. The golf ball according to claim 1, wherein the linear molecule has a weight average molecular weight ranging from 5,000 to 100,000.

14. The golf ball according to claim 1, wherein a ratio of the hydroxyl groups modified with the caprolactone chain to all the hydroxyl groups included in the cyclodextrin before the modification is 2 mole % or more.

15. The golf ball according to claim 1, wherein the polyrotaxane has a hydroxyl value ranging from 10 mg KOH/g to 400 mg KOH/g.

16. The golf ball according to claim 1, wherein the polyrotaxane has a weight average molecular weight ranging from 30,000 to 3,000,000.

17. The golf ball according to claim 1, wherein the paint film has a 10% elastic modulus of 160 kgf/cm$^2$ or less.

18. The golf ball according to claim 1, wherein the golf ball body comprises a core and a cover covering the core, and the cover has a slab hardness of 70 or less in Shore D hardness.

19. A golf ball comprising a golf ball body and a paint film formed on a surface of the golf ball body,
   wherein the paint film is formed from a curing type paint composition including: a base material containing a polyrotaxane and at least one polyol selected from the group consisting of a polyether polyol, a polyester polyol, a polycaprolactone polyol, a polycarbonate polyol, and an acrylic polyol, and a curing agent containing a polyisocyanate; and
   wherein the polyrotaxane comprises a cyclodextrin, and a linear molecule included in the cyclodextrin cyclic structure in a manner of piercing through the cyclic structure of the cyclodextrin, the linear molecule having blocking groups located at both ends of the linear molecule to prevent disassociation of the cyclodextrin, and at least a portion of the cyclodextrin hydroxyl groups being modified with a caprolactone chain expressed by —(CO(CH$_2$)$_5$O)nH via a —O—C$_3$H$_6$—O— group, wherein n represents the degree of polymerization and is a natural number of 2 to 70.

20. A golf ball comprising a golf ball body and a paint film formed on a surface of the golf ball body,
   wherein the paint film is formed from a curing type paint composition including: a base material containing a polyrotaxane, a curing agent containing a polyisocyanate, and at least one member selected from the group consisting of a vinyl chloride-vinyl acetate copolymer, a modified product of a vinyl chloride-vinyl acetate copolymer and a modified silicone; and
   wherein the polyrotaxane comprises a cyclodextrin, and a linear molecule included in the cyclodextrin cyclic structure in a manner of piercing through the cyclic structure of the cyclodextrin, the linear molecule having blocking groups located at both ends of the linear molecule to prevent disassociation of the cyclodextrin, and at least a portion of the cyclodextrin hydroxyl groups being modified with a caprolactone chain expressed by —(CO(CH$_2$)$_5$O)nH via a —O—C$_3$H$_6$—O— group, wherein n represents the degree of polymerization and is a natural number of 2 to 70.

* * * * *